United States Patent
Chen et al.

(10) Patent No.: US 12,481,815 B2
(45) Date of Patent: Nov. 25, 2025

(54) CIRCUIT SIMULATION METHOD AND CIRCUIT SIMULATION SYSTEM

(71) Applicant: REALTEK SEMICONDUCTOR CORPORATION, Hsinchu (TW)

(72) Inventors: Ying-Chieh Chen, Hsinchu (TW); Mei-Li Yu, Hsinchu (TW); Yu-Lan Lo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 867 days.

(21) Appl. No.: 17/743,490

(22) Filed: May 13, 2022

(65) Prior Publication Data
US 2022/0374574 A1  Nov. 24, 2022

(30) Foreign Application Priority Data
May 18, 2021 (TW) ................. 110117928

(51) Int. Cl.
*G06F 30/367* (2020.01)
*G06F 111/08* (2020.01)
*G06F 119/22* (2020.01)

(52) U.S. Cl.
CPC ........ *G06F 30/367* (2020.01); *G06F 2111/08* (2020.01); *G06F 2119/22* (2020.01)

(58) Field of Classification Search
CPC . G06F 30/367; G06F 2111/08; G06F 2119/22
USPC ........................................................ 703/14
See application file for complete search history.

(56) References Cited

U.S. PATENT DOCUMENTS

| 5,523,960 | A  | * | 6/1996  | Jeong ............... G06Q 10/06 705/7.26 |
| 2015/0339414 | A1 |   | 11/2015 | Kuo et al. |
| 2018/0247698 | A1 |   | 8/2018  | Park et al. |
| 2019/0065630 | A1 |   | 2/2019  | Kim et al. |
| 2019/0171190 | A1 | * | 6/2019  | McDaniel ........ G05B 19/41835 |
| 2020/0379630 | A1 | * | 12/2020 | Tsunoda ................ G06V 20/68 |

OTHER PUBLICATIONS

OA letter of a counterpart TW application (appl. No. 110117928) mailed on Nov. 17, 2021. Summary of the OA letter: 1. Claims 1 and 8 are rejected as allegedly being unclear. 2. Claims 1-10 are rejected as allegedly being unpatentable over (US 2019/0065630A1) in view of (US 2015/0339414A1). Correspondence between claims of TW counterpart application and claims of US application: 1. Claims 1-7 and 8-10 in TW counterpart application correspond to claims 1-7 and 9-11 in US application, respectively.

* cited by examiner

*Primary Examiner* — John E Johansen
(74) *Attorney, Agent, or Firm* — WPAT, PC (57) ABSTRACT

A circuit simulation method includes the following operations: performing Monte Carlo simulations in parallel according to a first netlist file and process model data, in order to generate a performance simulation result, in which the first netlist file is configured to indicate a basic circuit in a circuitry; selecting component parameters lower than a predetermined yield rate according to the performance simulation result; and determining whether an estimated yield rate of the circuitry meets the predetermined yield rate according to the component parameters.

16 Claims, 5 Drawing Sheets

CIRCUIT SIMULATION METHOD AND CIRCUIT SIMULATION SYSTEM

BACKGROUND OF THE INVENTION

1. Field of the Invention

The present disclosure relates to a circuit simulation method, especially to a circuit simulation method and a circuit simulation system that are able to derive a yield rate of a memory.

2. Description of Related Art

A yield rate of a chip is generally estimated by using a mathematic mode or a normal distribution function. However, with the devolvement of manufacturing process, under certain conditions, characteristics of transistors in an advance manufacturing process may not meet original distribution. As a result, the accurate yield rate of the chip cannot be estimated. On the other hand, if a Monte Carlo simulation are performed on all circuits in the chip, a more accurate yield rate may be obtained. However, such simulation is time-consuming and almost impossible to implement in a limited development timeline.

SUMMARY OF THE INVENTION

In some aspects of the present disclosure, a circuit simulation method includes the following operations: performing a plurality of Monte Carlo simulations in parallel according to a first netlist file and process model data, in order to generate a performance simulation result, in which the first netlist file is configured to indicate a basic circuit in a circuitry; selecting a plurality of component parameters lower than a predetermined yield rate according to the performance simulation result; and determining whether an estimated yield rate of the circuitry meets the predetermined yield rate according to the plurality of component parameters.

In some aspects of the present disclosure, a circuit simulation system includes at least one memory circuit and at least one processor circuit. The at least one memory circuit is configured to store program codes. The at least one processor circuit configured to perform the plurality of program codes stored in the at least one memory circuit to: perform a plurality of Monte Carlo simulations in parallel according to a first netlist file and process model data, in order to generate a performance simulation result, in which the first netlist file is configured to indicate a basic circuit in a circuitry; select a plurality of component parameters lower than a predetermined yield rate according to the performance simulation result; and determine whether an estimated yield rate of the circuitry meets the predetermined yield rate according to the plurality of component parameters.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
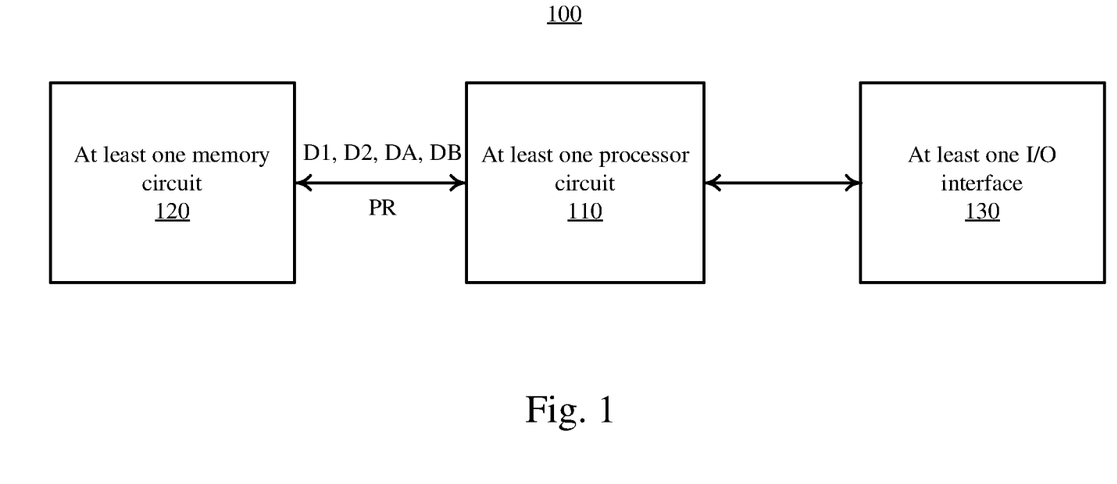
FIG. 1 is a schematic diagram of a circuit simulation system according to some embodiments of the present disclosure.

FIG. 1 is a schematic diagram of a circuit simulation system 100 according to some embodiments of the present disclosure. In some embodiments, the circuit simulation system 100 may be configured to execute a circuit simulation method 300 in FIG. 3, in order to estimate a yield rate of a circuitry.

The circuit simulation system 100 includes at least one processor circuit 110, at least one memory circuit 120, and at least one Input/output (I/O) interface 130. The at least one processor circuit 110 is coupled to the at least one memory circuit 120 and the at least one I/O interface 130. In different embodiments, the at least one processor circuit 110 may be, but not limited to, a central processing unit (CPU), an application-specific integrated circuit, or a distributed processing system, and so on. Various circuits or units to implement the at least one processor circuit 110 are within the contemplated scope of the present disclosure.

The at least one memory circuit 120 stores at least one program code which is for aiding the design integrated circuit(s). For example, the at least one program code is encoded with multiple instruction sets which are configured to execute a Monte Carlo simulation and/or other circuit simulation(s) on the integrated circuit(s), in order to verify the performance and/or the yield rate of the integrated circuit(s). In some embodiments, the at least one processor circuit 110 may perform program codes stored in the at least one memory circuit 120, in order to perform operations of the circuit simulation method 300 in FIG. 3. In some embodiments, the at least one memory circuit 120 may store a netlist file D1 that indicates a memory cell circuit 214 in FIG. 2A and process model data DA, in order to provide those files to the at least one processor circuit 110 for performing Monte Carlo simulation or various circuit simulations. In some embodiments, the process model data DA is data, which is provided from a foundry, for defining component parameters in a specific manufacturing process. In some embodiments, the at least one memory circuit 120 may store the simulation results of the above simulations (e.g., a performance simulation result PR), in order to provide the same to the at least one processor circuit 110 for subsequent analysis. In some embodiments, the at least one memory circuit 120 further stores at least one computer-aided design software, which is configured to run a circuit simulation and/or Monte Carlo simulation according to the netlist file D1 (or a netlist file D2). For example, the at least one computer-aided software may be, but not limited to, HSPICE.

In some embodiments, the at least one memory circuit 120 may be a non-transitory computer readable storage medium, which stores at least one program code for running circuit simulation(s). For example, the at least one memory circuit 120 stores executable instructions for performing the circuit simulation method 300. In some embodiments, the computer readable medium may be, but not limited to, electronic, magnetic, optical, infrared, and/or semiconductor device(s). For example, the computer readable storage medium includes, but not limited to, semiconductor or solid-state memory, tape, removable computer disk, RAM, ROM, rigid disk and/or optical disk. In some embodiments, the optical disk includes, but not limited to, CD-ROM, CD-R/W, and/or DVD.

The at least one I/O interface 130 may receive data (e.g., the netlist file D1, the process model data DA, the value of the yield rate, the netlist file D2, and so on) and commands from various control devices which are manipulated by a circuit designer or a verification engineer. Accordingly, the circuit simulation system 100 may be manipulated by inputs or commands from the at least one I/O interface 130. In some embodiments, the at least one I/O interface 130 includes a screen that shows a status of execution of the program code and/or an experiment result of the Monte Carlo simulation. In some embodiments, the at least one I/O interface 130 may include, but not limited to, a graphic user interface (GUI). In some embodiments, the at least one I/O interface 130 may include a keyboard, keypad, mouse, trackball, trackpad, touch screen, cursor direction keys, or the combination thereof, for communicating information and commands to the at least one processor circuit 110.

Figure 2A:
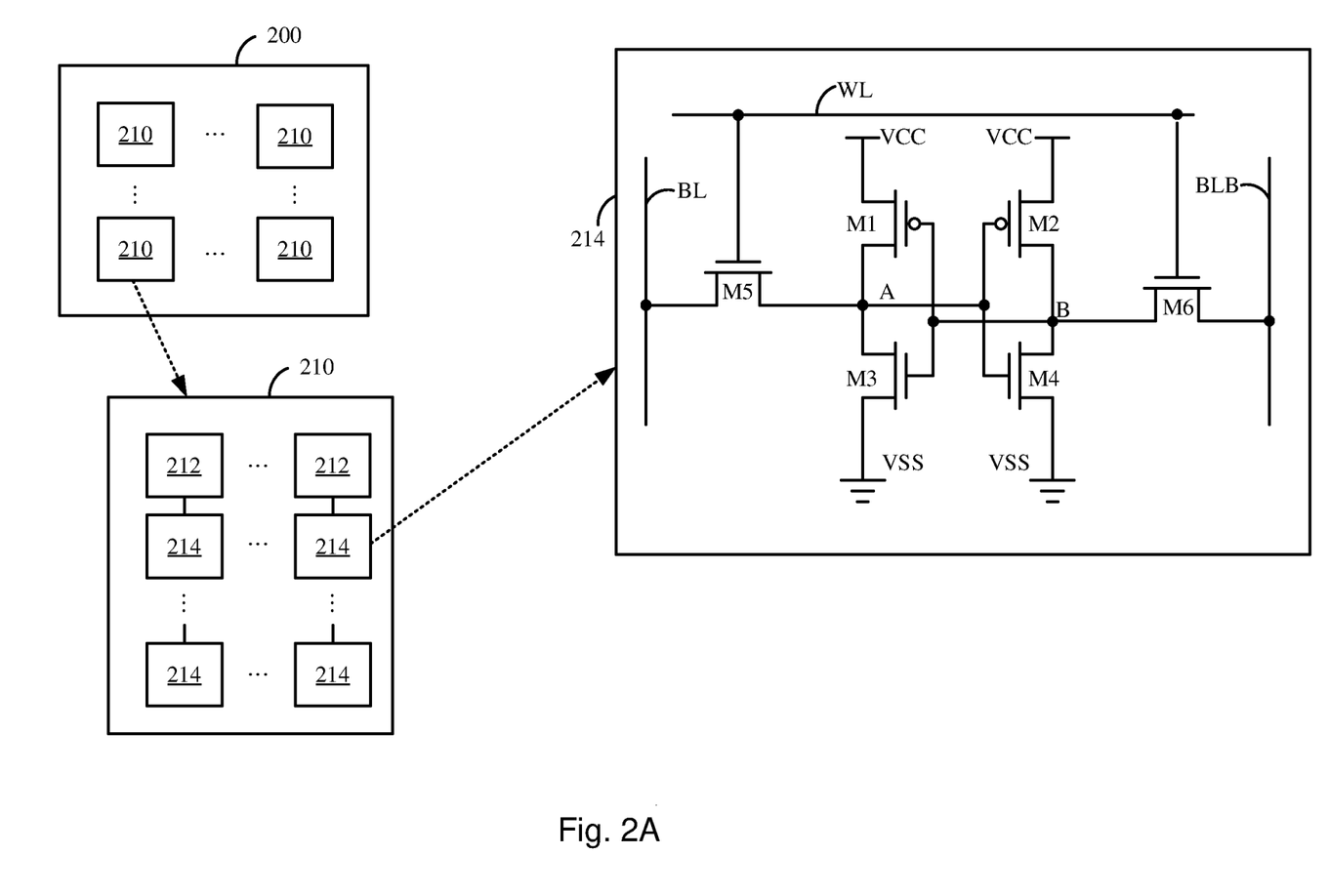
FIG. 2A is a schematic diagram of a circuitry according to some embodiments of the present disclosure.

FIG. 2A is a schematic diagram of a circuitry 200 according to some embodiments of the present disclosure. In some embodiments, the circuit simulation system 100 in FIG. 1 may run a circuit simulation on one or more circuits in the circuitry 200.

In some embodiments, the circuitry 200 may be a memory. For example, the circuitry 200 may be, but not limited to, a static random-access memory. As an example, the circuitry 200 includes 128 control logic circuits 210. Each control logic circuit 210 includes 64 sense amplifier circuits 212 and multiple memory cell circuits 214. For example, each sense amplifier circuit 212 may be configured to read 128 memory cell circuits 214. In other words, the circuitry 200 has 128×64×128 memory cell circuits 214.

In some embodiments, each the memory cell circuit 214 may be, but not limited to, a memory cell including six transistors, which can be configured to store one bit. In other embodiments, the memory cell circuit 214 may include more transistors (for example, the memory cell circuit 214 may include 8 transistors). In greater detail, as shown in FIG. 2A, the memory cell circuit 214 includes transistors M1-M6. A first terminal (e.g., drain) of the transistor M1 is coupled to a node A, a control terminal (e.g., gate) of the transistor M1 is coupled to a node B, a second terminal (e.g., source) of the transistor M1 is configured to receive a voltage VCC, and a body (not shown) of the transistor M1 receives the voltage VCC. A first terminal of the transistor M2 is coupled to the node B, a control terminal of the transistor M2 is coupled to the node A, a second terminal of the transistor M2 is configured to receive the voltage VCC, and a body (not shown) of the transistor M2 receives the voltage VCC. A first terminal of the transistor M3 is coupled to the node A, a control terminal of the transistor M3 is coupled to the node B, a second terminal of the transistor M3 is configured to receive a voltage VSS, a body (not shown) of the transistor M3 receives the voltage VSS. A first terminal of the transistor M4 is coupled to the node B, a control terminal of the transistor M4 is coupled to the node A, a second terminal of the transistor M4 is configured to receive the voltage VSS, and a body (not shown) of the transistor M4 receives the voltage VSS. A first terminal of the transistor M5 is coupled to a bit line BL, a control terminal of the transistor M5 is coupled to a word line WL, a second terminal of the transistor M5 is coupled to the node A, and a body (not shown) of the transistor M5 receives the voltage VSS. A first terminal of the transistor M6 is coupled to a bit line BLB, a control terminal of the transistor M6 is coupled to the word line WL, a second terminal of the transistor M6 is coupled to the node B, and a body (not shown) of the transistor M6 receives the voltage VSS.

Figure 2B:
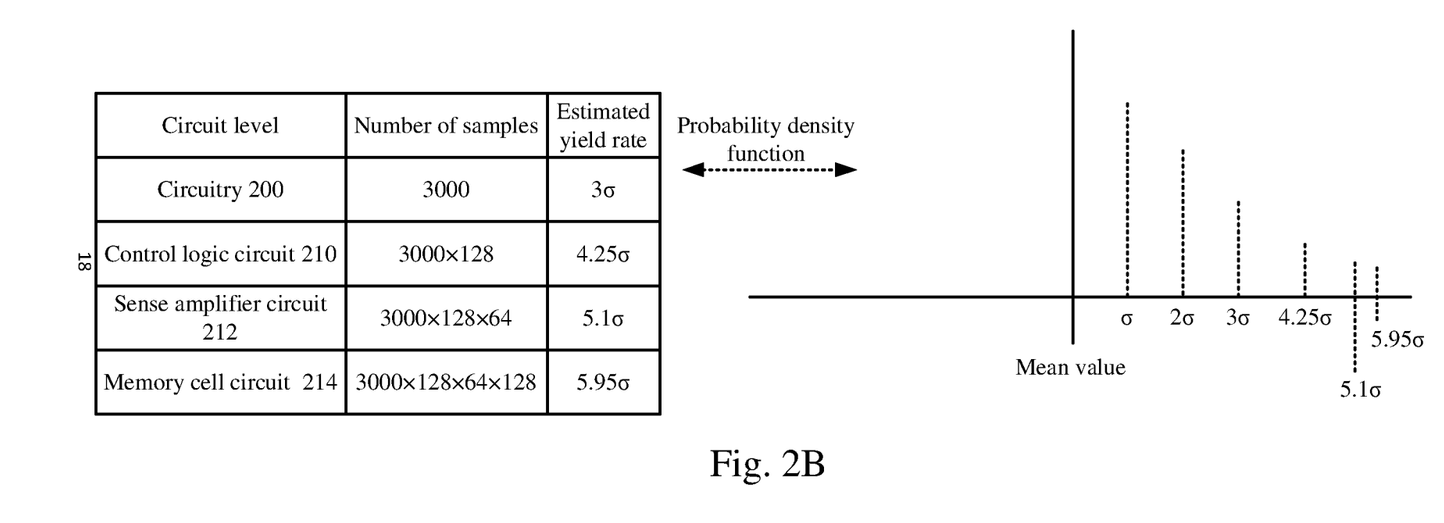
FIG. 2B is a schematic diagram illustrating setting conditions for running simulation on 3000 circuitries in FIG. 2A according to some embodiments of the present disclosure.

FIG. 2B is a schematic diagram illustrating setting conditions for running simulation on 3000 circuitries 200 in FIG. 2A according to some embodiments of the present disclosure. In this example, according to a performance indicator (e.g., a lowest operating speed of the circuitry 200 (e.g., read/write speed of the memory) or highest power consumption, and so on), the yield rate of 3000 circuitries 200 corresponds to three sigma ($3\sigma$). Under this condition, an integration can be performed according to a probability density function (which may be, but not limited to, Gaussian distribution function), in order to derive a standard deviation to which each circuitry corresponds to. For example, the yield rate corresponding to the control logic circuits 210 in each of the 3000 circuitries 200 (e.g., the number of samples is 3000×128) is about $4.25\sigma$. With this analogy, the yield rate corresponding to the sense amplifier circuits 212 in each of 3000 circuitries 200 (i.e., the number of samples is 3000×128×64) can be derived to be about $5.1\sigma$. The yield rate corresponding to the memory cell circuits 214 in each of the 3000 circuitries 200 (i.e., the number of samples is 3000×128×64×128) is about $5.95\sigma$. With above analysis, it should be understood that, if the yield rate corresponding to one memory cell circuit 214 is $6\sigma$, the yield rate of 3000 circuitries 200 can correspond to $3\sigma$.

In some related approaches, multiple Monte Carlo simulations are performed on all circuits in a chip to derive an estimated yield rate of the chip. However, in these approaches, if the number of circuits is too high, the overall simulation can be quite time consuming. Taking examples of FIG. 2B, in those approaches, multiple Monte Carlo simulations are required to be performed on at least 3000×128×64×128 memory cell circuits 214, 3000×128×64 sense amplifier circuits 212, and 3000×128 control logic circuits 210. In some other related approaches, a yield rate of the chip is derived by performing a normal distribution function on all circuits in the chip. However, the normal distribution may be unsuitable for estimating a standard variation of a transistor having a small size and/or a low threshold voltage in an advanced manufacturing process. As a result, those approaches cannot obtain an accurate estimated yield rate of a chip implemented with the advanced manufacturing process. Compared with the above approaches, by using the circuit simulation method 300 in FIG. 3, the circuit simulation system 100 is able to determine the estimated yield rate of the chip efficiently and derive a more accurate estimated yield rate of the chip implemented with an advanced manufacturing process.

Figure 3:
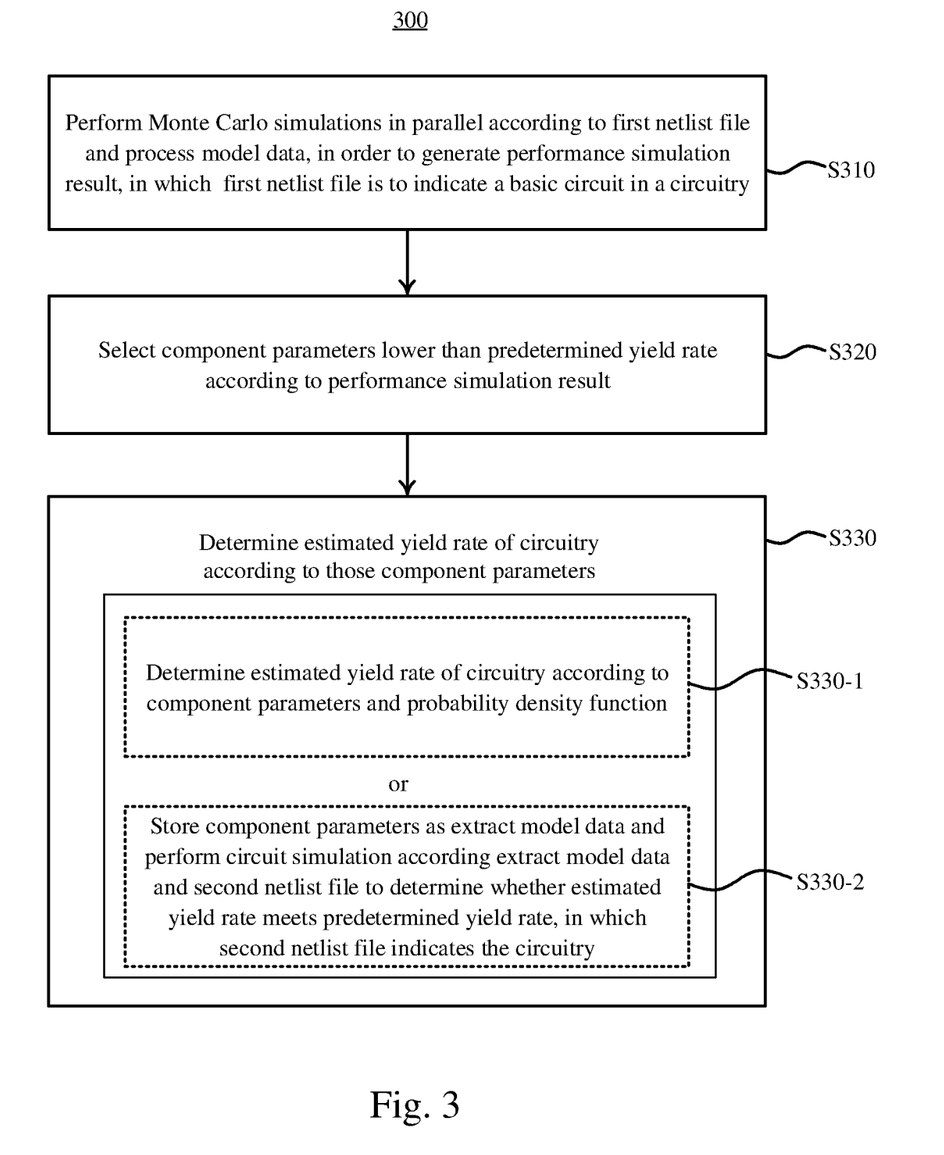
FIG. 3 is a flow chart of a circuit simulation method according to some embodiments of the present disclosure.

FIG. 3 is a flow chart of the circuit simulation method 300 according to some embodiments of the present disclosure. In some embodiments, various operations of the circuit simulation method 300 may be implemented as a computer program that is stored in a non-transitory computer readable medium (not shown). In some embodiments, the circuit simulation method 300 may be, but not limited to, performed by the circuit simulation system 100 in FIG. 1. For ease of illustration, related operations of the circuit simulation system 100 and those of the circuit simulation method 300 are described together.

In operation S310, multiple Monte Carlo simulations are performed in parallel according to a first netlist file and process model data, in order to generate a performance simulation result, in which the first netlist file is to indicate a basic circuit in a circuitry. In some embodiments, the basic circuit is a circuit that is able to operate independently and has a lowest number of transistors in the circuitry. Taking the circuitry 200 in FIG. 2A as an example, the basic circuit may be the memory cell circuit 214. The first netlist file may be the netlist file D1 in FIG. 1 that indicates internal connections of the basic circuit (which is the memory cell circuit 214 in this example). In some embodiments, the contents of the netlist file D1 follow a predetermined type of syntax, which is able to record and/or design a circuit in a descriptive format recognizable by the circuit simulation system 100. In some embodiments, the predetermined type of syntax is BERKELEY SPICE syntax. In some other embodiments, the predetermined type of syntax is HSPICE syntax. Taking HSPICE as an example, the content of the netlist file D1 is as follows:

M1 A B VCC VCC pch
M2 B A VCC VCC pch
M3 A B VSS VSS nch
M4 B A VSS VSS nch
M5 BL WL A VSS nch
M6 BLB WL B VSS nch In the above netlist file D1, the first row to the sixth row respectively define terminals of the transistor M1 to the transistor M6 of the memory cell circuit 214 in FIG. 2A. Taking the first row as an example, in the description of the first row, "A" indicates that the drain of the transistor M1 is coupled to the node A. "B" indicates that the gate of the transistor M1 is coupled to the node B. The first "VCC" indicates that the source of the transistor M1 receives the voltage VCC. The second "VCC" indicates that the body of the transistor M1 receives the voltage VCC. "pch" indicates that the transistor M1 is a P-type transistor, and the corresponding component parameters thereof are stored in the process parameter data DA. Similarly, "nch" indicates the corresponding transistor is a N-type transistor, and the corresponding component parameters thereof are stored in the process parameter data DA. With this analogy, it should be understood that the corresponding relation between the netlist file D1 and the memory cell circuit 214. The contents of the netlist file D1 are given for illustrative purposes, and the present disclosure is not limited thereto. In practical applications, the contents of the netlist file D1 may further include, but not limited to, the information about sizes of the transistors M1-M6, and so on.

In some embodiments, the at least one processor circuit 110 may transmit the netlist file D1 and the process parameter data DA to workstations or simulation tools (not shown), in order to perform multiple Monte Carlo simulations in parallel to obtain the performance simulation result PR. In some embodiments, in the above Monte Carlo simulations, a random amount of variation(s) or offset(s) may be added to related component parameters of the transistors M1 to M6 during the progress of testing the performance (which may be, but not limited to, read speed, write speed, or power consumption) of the memory cell circuit 214 according to the netlist file D1 and the process parameter data DA. In other words, the performance simulation result PR can indicate the distribution of the operating speed or the power consumption of the memory cell circuit 214 under these variations or offsets. The at least one processor circuit 110 may receive and combine the execution results of the multiple Monte Carlo simulations, in order to generate the performance simulation result PR.

Figure 4:
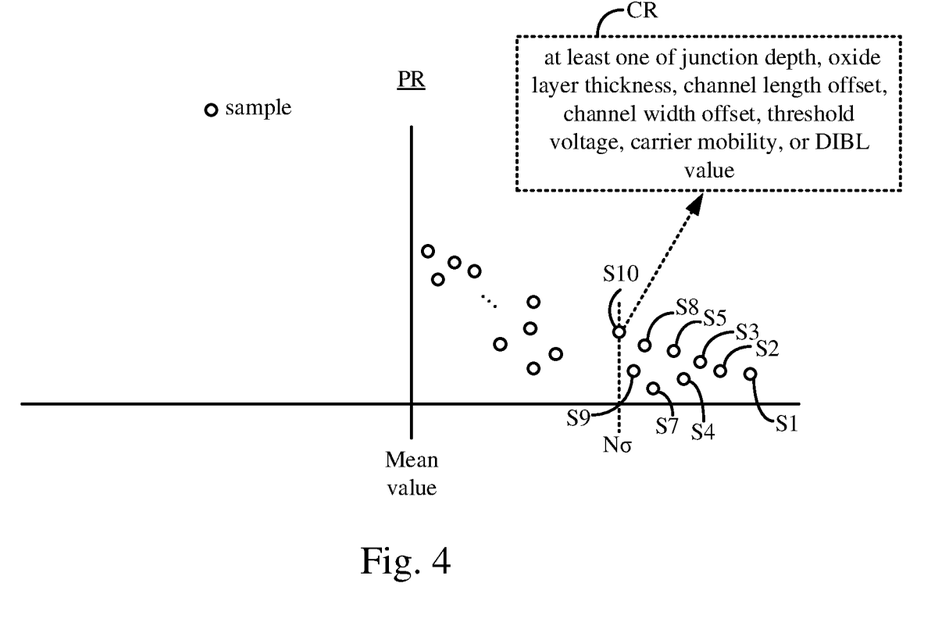
FIG. 4 is a schematic diagram of a performance simulation result according to some embodiments of the present disclosure.

Reference is made to FIG. 4, and FIG. 4 is a schematic diagram of the performance simulation result PR according to some embodiments of the present disclosure. After combining the execution results of the Monte Carlo simulations, the at least one processor circuit 110 may generate a corresponding probability distribution (which equals to the performance simulation result PR) according to multiple samples and the corresponding performances. In FIG. 4, each sample (shown with white dots) corresponding to a set of component parameters CR. For example, the set of component parameter CR may include at least one of junction depth, oxide layer thickness, channel length offset, channel width offset, threshold voltage, carrier mobility, or a drain induce barrier lowing (DIBL) value of at least one transistor in the basic circuit (e.g., the memory cell circuit 214). Parameters including junction depth, oxide layer thickness, channel length offset, and/or channel width offset are global component parameters, which are mainly related to variations between chips. Parameters including threshold voltage, carrier mobility, and/or the DIBL value are mainly related to variation in a single chip. The types of the component parameters CR are given for illustrative purposes, and the present disclosure is not limited thereto. Various component parameters that may affect circuit performance are within the contemplated scope of the present disclosure.

With continued reference to FIG. 3, in operation S320, component parameters lower than a predetermined yield rate are selected according to the performance simulation result. If the predetermined yield rate is 2999/3000, it indicates that only 10 circuitries 200 in the 3000 circuitries 200 are failures. As shown in FIG. 4, if the number of total simulations (or samples) is 3000, according to the requirement of the predetermined yield rate, the at least one processor circuit 110 may select the top 10 sets of component parameters (e.g., the sets of component parameters CR respectively corresponding to samples S1-S10) with largest difference from a performance mean value from the performance simulation result PR.

With continued reference to FIG. 3, in operation S330, the estimated yield rate of the circuitry is determined according to those component parameters. In different embodiments, operation S330 may include step S330-1 or step S330-2. In step S330-1, the estimated yield rate of the circuitry is determined according to the component parameters and a probability density function. As shown in FIG. 4, the sample S10 is a sample closet to the performance mean value in the samples S1-S10, and the location of the sample 10 corresponds to N standard deviations (i.e., Nσ, which may be, for example but not limited to, 6σ). Similar to FIG. 2B, the at least one processor circuit 110 may perform integration by utilizing the probability density function (which may be, but not limited to, Gaussian function), and the number of sample(s) that is/are within the N standard deviations in the performance simulation result PR. As a result, the at least one processor circuit 110 may derive the estimated yield rate of the circuitry 200, and determine whether the estimated yield rate meets the predetermined yield rate.

On the other hand, in step S330-2, the component parameters are stored as extract model data, and a circuit simulation is performed according the extract model data and a second netlist file to determine whether the estimated yield rate meets the predetermined yield rate, in which the second netlist file indicates the circuitry. For example, the at least one processor circuit 110 may record the ten sets of component parameters corresponding to the samples S1-S10 in FIG. 4 as extract model data DB, and store the extract model data DB to the at least one memory circuit 120. As shown in FIG. 1, the at least one memory circuit 120 further stores the netlist file D2, which is configured to indicate the circuitry 200 in FIG. 2A. The at least one processor circuit 110 may perform the circuit simulation according to the extract model data DB and the netlist file D2, in order to determine whether the estimated yield rate of the circuitry 200 meets the predetermined yield rate. For example, in the first simulation, the at least one processor circuit 110 may select a first set of component parameters from the extract model data DB, and may apply the set of the component parameters to transistors in the circuitry 200 according to the netlist file D2, in order to perform the circuit simulation to determine the performance of the circuitry 200. In a second simulation, the at least one processor circuit 110 may select a second set of component parameters from the extract model data DB, and may apply the set of component parameters to the transistors in the circuitry 200 according to the netlist file D2, in order to perform the circuit simulation to determine the performance of the circuitry 200. With this analogy, the at least one processor circuit 110 is able to determine whether the performance of the circuitry 200 under the ten sets of component parameters meets the requirements of predetermined yield rate. With the above arrangement, the estimated yield rate of the circuitry 200 can be efficiently derived. If the circuitry 200 can operate correctly under the ten sets of component parameters, it indicates that the circuitry 200 meets the requirements of the predetermined yield rate.

Compare with the aforementioned related approaches, the Monte Carlo simulation are performed on the basic circuit (e.g., the memory cell circuit 214) that has a lower number of transistors. As a result, the total simulation time can be significantly reduced. By using the above simulations to generate the extract model data DB, it is able to estimate the yield rate of the circuitry 200 more efficiently. Moreover, compared with the approaches that only utilize the normal distribution function for estimation, the estimation of the above embodiments is made by using Monte Carlo simulations to cover possible variations, and thus the yield rate of the chip implemented in an advance manufacturing process can be estimated. On the other hand, the extract model data DB can be further utilized to estimate the yield rate of other circuitry which employs the same basic circuit, which can shorten chip development time effectively.

The above description of the circuit simulation method 300 includes exemplary operations, but the operations of the circuit simulation method 300 are not necessarily performed in the order described above. Operations of the circuit simulation method 300 can be added, replaced, changed order, and/or eliminated, or the operations of the circuit simulation method 300 can be executed simultaneously or partially simultaneously as appropriate, in accordance with the spirit and scope of various embodiments of the present disclosure.

For illustrative purposes, the above examples are described with the memory (i.e., circuitry 200) and the memory cell circuit 214, but the present disclosure is not limited thereto. Various types of the circuitry and those of the basic circuit are within the contemplated scope of the present disclosure. In other words, in some other embodiments, the circuitry 200 is not a memory, and the basic circuit in the circuitry 200 is not a memory cell circuit.

As described above, the circuit simulation method and the circuit simulation system, provided in some embodiments of the present disclosure, may utilize a basic circuit having lower number of transistors to extract sets of component parameters that may affect the yield rate, and utilize those sets of component parameters to derive the yield rate of the total circuitry. As a result, the simulation time can be reduced and an accurate simulation result can be obtained.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:
1. A circuit simulation method, comprising:
performing a plurality of Monte Carlo simulations in parallel according to a first netlist file and process model data, in order to generate a performance simu- lation result, wherein the first netlist file is configured to indicate a basic circuit in a circuitry;

selecting a plurality of component parameters lower than a predetermined yield rate according to the performance simulation result; and determining whether an estimated yield rate of the circuitry meets the predetermined yield rate according to the plurality of component parameters.

2. The circuit simulation method of claim 1, wherein the circuitry is a memory, and the basic circuit is a memory cell circuit for storing a bit in the memory.

3. The circuit simulation method of claim 1, wherein the basic circuit is a memory cell circuit that comprises six or eight transistors.

4. The circuit simulation method of claim 1, wherein the performance simulation result is configured to indicate a distribution of an operating speed or a power consumption of the basic circuit.

5. The circuit simulation method of claim 1, wherein the plurality of component parameters comprise at least one of a junction depth, an oxide layer thickness, a channel length offset, a channel width offset, a threshold voltage, a carrier mobility, or a drain induce barrier lowing value of at least one transistor in the basic circuit.

6. The circuit simulation method of claim 1, wherein determining whether the estimated yield rate of the circuitry meets the predetermined yield rate according to the plurality of component parameters comprises:

determining the estimated yield rate of the circuitry according to the plurality of component parameters and a probability density function.

7. The circuit simulation method of claim 1, wherein determining whether the estimated yield rate of the circuitry meets the predetermined yield rate according to the plurality of component parameters comprises:

storing the plurality of component parameters as extract model data; and performing a circuit simulation according to the extract model data and a second netlist file to determine whether the estimated yield rate meets the predetermined yield rate.

8. The circuit simulation method of claim 1, wherein the basic circuit is a circuit that operates independently and has a lowest number of transistors in the circuitry.

9. A circuit simulation system, comprising:

at least one memory circuit configured to store a plurality of program codes; and at least one processor circuit configured to perform the plurality of program codes stored in the at least one memory circuit to:

perform a plurality of Monte Carlo simulations in parallel according to a first netlist file and process model data, in order to generate a performance simulation result, wherein the first netlist file is configured to indicate a basic circuit in a circuitry;

select a plurality of component parameters lower than a predetermined yield rate according to the performance simulation result; and determine whether an estimated yield rate of the circuitry meets the predetermined yield rate according to the plurality of component parameters.

10. The circuit simulation system of claim 9, wherein the at least one processor circuit is configured to determine the estimated yield rate of the circuitry according to the plurality of component parameters and a probability density function, in order to determine whether the estimated yield rate meets the predetermined yield rate.

11. The circuit simulation system of claim 9, wherein the at least one processor circuit is configured to store the plurality of component parameters as extract model data and perform a circuit simulation according to the extract model data and a second netlist file, in order to determine whether the estimated yield rate meets the predetermined yield rate.

12. The circuit simulation system of claim 9, wherein the circuitry is a memory, and the basic circuit is a memory cell circuit for storing a bit in the memory.

13. The circuit simulation system of claim 9, wherein the basic circuit is a memory cell circuit that comprises six or eight transistors.

14. The circuit simulation system of claim 9, wherein the performance simulation result is configured to indicate a distribution of an operating speed or a power consumption of the basic circuit.

15. The circuit simulation system of claim 9, wherein the plurality of component parameters comprise at least one of a junction depth, an oxide layer thickness, a channel length offset, a channel width offset, a threshold voltage, a carrier mobility, or a drain induce barrier lowing value of at least one transistor in the basic circuit.

16. The circuit simulation system of claim 9, wherein the basic circuit is a circuit that operates independently and has a lowest number of transistors in the circuitry.

* * * * *